United States Patent [19]
Shimizu et al.

[11] Patent Number: 5,489,004
[45] Date of Patent: Feb. 6, 1996

[54] VARIABLE RATIO STEERING SYSTEM

[75] Inventors: Yasuo Shimizu; Toshitake Kawai; Shigeru Tajima, all of Saitama, Japan

[73] Assignee: Honda Giken Kogyo Kabushiki Kaisha, Tokyo, Japan

[21] Appl. No.: 379,988

[22] Filed: Jan. 27, 1995

[30] Foreign Application Priority Data

Mar. 18, 1994 [JP] Japan .................................. 6-074192

[51] Int. Cl.$^6$ ..................................................... B62D 3/12
[52] U.S. Cl. ............................ 180/79; 74/498; 74/571 M
[58] Field of Search ........................... 180/79, 79.1, 79.3, 180/148, 151, 141, 142, 143, 146, 147; 74/498, 571 M

[56] References Cited

U.S. PATENT DOCUMENTS

| | | | |
|---|---|---|---|
| 4,299,302 | 11/1981 | Nishikawa et al. | 74/498 X |
| 5,174,407 | 12/1992 | Shimizu et al. | 180/79 X |
| 5,203,421 | 4/1993 | Ueno et al. | 180/79 X |
| 5,284,219 | 2/1994 | Shimizu et al. | 180/79 X |
| 5,386,879 | 2/1995 | Shimizu | 180/79 |

*Primary Examiner*—Kevin T. Hurley
*Attorney, Agent, or Firm*—Nikaido, Marmelstein, Murray & Oram

[57] ABSTRACT

In a variable ratio steering system, the input shaft is rotatably supported by a support member which is in turn rotatably supported by a casing, and the axial lines of these two parts extend in parallel with each other, and are offset from each other. While the point of action between the input shaft and the output shaft is fixed relative to the output shaft, the distance between the point of action and the axial center line of the input shaft changes in dependence on both the angular position of the support member and the amplitude of the input angle. Thus, by appropriately determining the relative relationships between the axial lines of the input and output shafts and a rotatable range of the support member, it is possible to achieve a desired non-linear relationship between the rotational angles of the input shaft and the output shaft. It is therefore possible to improve the handling of the vehicle, for instance in parking the vehicle in a small space, and steer the vehicle with a least amount of effort in a low speed range, and to increase the stability of the vehicle in a high speed range. Furthermore, this can be achieved with a highly simple and play-free structure.

9 Claims, 11 Drawing Sheets he present invention relates to a variable ratio steering
VARIABLE RATIO STEERING SYSTEM

TECHNICAL FIELD

The present invention relates to a variable ratio steering system for a vehicle which can vary the ratio of the steered angle of the steerable road wheels to the steering angle of the steering wheel or the steering-angle ratio.

BACKGROUND OF THE INVENTION

Automotive steering devices typically consist of a rack and pinion mechanism as illustrated in FIG. 8. As well known in the art, a steering wheel 1 is securely attached to an upper end of a steering shaft 2, and a lower end of the steering shaft 2 is connected to a coupling shaft 4 via a pair of universal joints 3. A pinion 5 is securely attached to a lower end of the coupling shaft 4, and meshes with a rack 6 which is connected to road wheels 9 via tie rods 7 and knuckle arms 8 as well known in the art. Thus, the rotational movement ($\beta$) of the pinion 5 is converted into a linear movement (L) of the rack 6 meshing with the pinion 5, which is in turn converted into a steering movement (T) of the road wheels 9 via the tie rods 7 and the knuckle arms 8.

According to such conventional steering devices, the steering angle (T) of the road wheels 9 changes substantially linearly with the rotational angle ($\alpha$) of the steering wheel 1. However, in view of the handling of the vehicle, the rotational angle of the steering wheel 1 for achieving a maximum steering angle of the road wheels 9 is desired to be fairly small. More specifically, if the relationship between the rotational angle of the steering wheel and the steering angle of the road wheels is determined to be as indicated by a chain dot line (v) of FIG. 9, the necessary rotational angle of the steering wheel 1 is reduced, and a favorable vehicle handling can be achieved in a low speed range, but the vehicle response (yaw rate, lateral acceleration and rolling movement) may become so excessive in high speed range that the vehicle handling in the high speed range may not be acceptable. It means that any fixed linear relationship between the rotational angle of the steering wheel and the steering angle of the road wheels cannot be satisfactory in all speed range.

Based on these considerations, the relationship between the rotational angle of the steering wheel and the steering angle of the road wheels is normally determined according to the compromise between the desired vehicle responses in both high and low speed ranges, and is typically determined in such a manner that a maximum steering angle can be achieved by turning the steering wheel 1.5 turns or 540 degrees from a neutral position in either direction as indicated by the fine straight line (w) in the graph of FIG. 9.

The graph of FIG. 10 conceptually shows the changes in the maximum practical steering angle with the vehicle speed. The fine curve (x) indicates the maximum practical steering angle for the conventional steering system. When the vehicle speed is extremely low, the steering wheel can be turned by up to 1.5 turns. However, in a high vehicle speed range, the rotational angle of the steering angle must be kept extremely small in order to operate the vehicle in a stable fashion. Ideally, it is desired to reduce the maximum practical steering wheel angle to a lower level in a low speed range, and to increase it in a high speed range as indicated by the bold curve (y) in FIG. 10. This can be accomplished by reducing the gear ratio between the steering wheel and the road wheels ($\beta/\alpha$) in the low speed range and increasing it in the high speed range.

The variable steering angle ratio steering system proposed in copending U.S. patent application Ser. No. 08/192,577 filed Feb. 7, 1994 was intended to achieve such a goal. As illustrated in FIG. 11, the system proposed in the copending patent application comprises an input shaft 101 connected to the steering wheel, and rotatably supported by a substantially cylindrical support member 103, via a dual radial bearing 102, which is in turn slidably supported by a casing 106 via support pins 104 and 105 integrally provided in the support member 103. An eccentric shaft 108 which is integrally provided in an output shaft 107 is coupled to the input shaft 101 via a slide coupling 109. The output shaft 107 is coupled to a pinion 5 which in turn meshes with a rack 6 for transmitting a steering torque to the road wheels. According to this steering system, by moving the support member 103 perpendicularly to the input shaft 101 and changing the eccentricity between the input shaft 101 and the output shaft 107, the steering angle ratio can be changed in a continuous manner.

According to this structure, however, if the mechanical rigidity of the power transmitting members of the steering system is not sufficient and/or the fabrication precision is not sufficient, the steering angle ratio may be affected by the magnitude of the steering load, and an unacceptable play may be created in the steering system. Also, the process of varying the steering gear ratio may not be smoothly carried out if the fabrication precision is not fairly high.

In particular, because this previously proposed variable steering ratio steering system involves a relatively low steering gear ratio as opposed to the conventional steering system based on the compromise between the requirements of both high and low speed ranges, it is necessary to increase the rigidity and make the gear ratio varying mechanism operate all the more smoothly. However, because the support pins 104 and 105 are slidably engaged by the casing 106, it is difficult to ensure a sufficient dimensional precision, to achieve a high supporting rigidity and to allow the gear ratio varying mechanism to operate smoothly.

Another variable ratio steering system is proposed in copending U.S. patent application Ser. No. 08/191,659 filed Feb. 4, 1994. The contents of these copending patent applications are incorporated herein by reference.

BRIEF SUMMARY OF THE INVENTION

In view of such problems of the previously proposed variable ratio steering systems, a primary object of the present invention is to provide a steering system which allows a large steering angle to be achieved with a minimum effort, and allows the vehicle to be operated in a stable fashion in a high speed range with a highly simple structure.

A second object of the present invention is to provide a variable gear ratio steering system which is free from plays in its torque transmitting members.

A third object of the present invention is to provide a variable gear ratio steering system which can be fabricated at a high precision without any substantial difficulty.

A fourth object of the present invention is to provide a variable gear ratio steering system which is provided with a high overall rigidity in its torque transmitting members.

A fifth object of the present invention is to provide a variable gear ratio steering system which can operate in a highly smooth fashion.

According to the present invention, these and other objects can be accomplished by providing a variable ratio steering system for a vehicle which can vary a ratio of a steering angle of steerable wheels to a steering angle of a steering wheel, comprising: a casing; a support member supported in the casing so as to be rotatable around a first axial line; an first shaft supported by the support member so as to be rotatable around a second axial line which is parallel with and offset from the first axial line; a second shaft supported by the casing so as to be rotatable around a third axial line which is parallel with the first and second axial lines; a pinion connected to one of the first and second shafts in power transmitting relationship and adapted to mesh with a rack functionally connected to the steerable wheels; actuating means for turning the support member around the first axial line for changing a relative eccentricity between the first shaft and the second shaft; and coupling means for transmitting an angular movement of the first shaft to the second shaft via a point of action of the second shaft offset from the third axial line; and input means for applying a steering input to the other one of the first and second shafts.

Typically, the first shaft serves as an input shaft to applying a steering input while the second shaft serves as an output shaft integrally provided with a pinion. If the first shaft is used as an output shaft, a suitable coupling such as an Oldham coupling may be necessary between the output shaft and the pinion to accommodate the lateral movement of the output shaft as the support member is turned and the eccentricity between the input shaft and the output shaft is changed.

In either case, the eccentricity between the input shaft and the output shaft can be varied in a continuous manner simply by turning the support member by using the actuating means. When the input shaft and the output shaft are eccentric to each other or when their axial lines are offset from each other, although the distance between the point of action and the third axial line is fixed, the distance between the point of action and the second axial line changes in dependence on both the eccentricity and the amplitude of the input angle. Thus, by appropriately determining the relative relationships between the axial lines and a rotatable range of the support member, it is possible to achieve a desired non-linear relationship between the rotational angle of the input shaft and the rotational angle of the output shaft.

If the ratio of a rotational angle of the output shaft to that of the input shaft is small when the rotational angle of the input shaft is small, and progressively increases as the rotational angle of the input shaft increases, a particularly favorable steering property can be achieved.

According to a preferred embodiment of the present invention, the coupling means comprises a slider provided on an end of the first shaft opposing the second shaft and adapted to move in a direction perpendicular to the second axial line, and pivot means for pivotally coupling the slider to the point of action of the second shaft. Preferably, the second shaft is provided with an intermediate shaft projecting integrally from an end of the second shaft opposing the first shaft in parallel with and offset from the third axial line, and the slider is provided with a hole for pivotably receiving the intermediate shaft. Thus, all the moving parts are rotating members, and can be supported in a play-free and highly rigid manner, for instance by using rolling bearings such as ball bearings and needle bearings.

Typically, the actuating means comprises an electric motor mounted in the casing, a worm secured to an output shaft of the motor, and a sector gear integrally formed with the support member and meshing with the worm so that the input versus output property of the steering system may be automatically and optimally adjusted according to the vehicle speed.

To simplify the assembling of the steering system of the present invention, preferably, the casing comprises at least a first casing half which rotatably supports the input shaft, and a second casing half which rotatably supports the output shaft, the two casing halves being joined together at a plane substantially perpendicular to the axial lines and passing through the coupling means.

If the relative relationships between the axial lines and a rotatable range of the support member can be determined in such a manner that the second axial line and the third axial line may be aligned with each other if so desired, and a one-to-one angle ratio may be achieved between the input shaft and the output shaft, it is possible to achieve a linear relationship between the input and the output shafts, and this is highly desirable in a low speed range because the vehicle operator can accurately and comfortably predict the steering angle of the road wheels according to the turning angle of the steering wheel.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
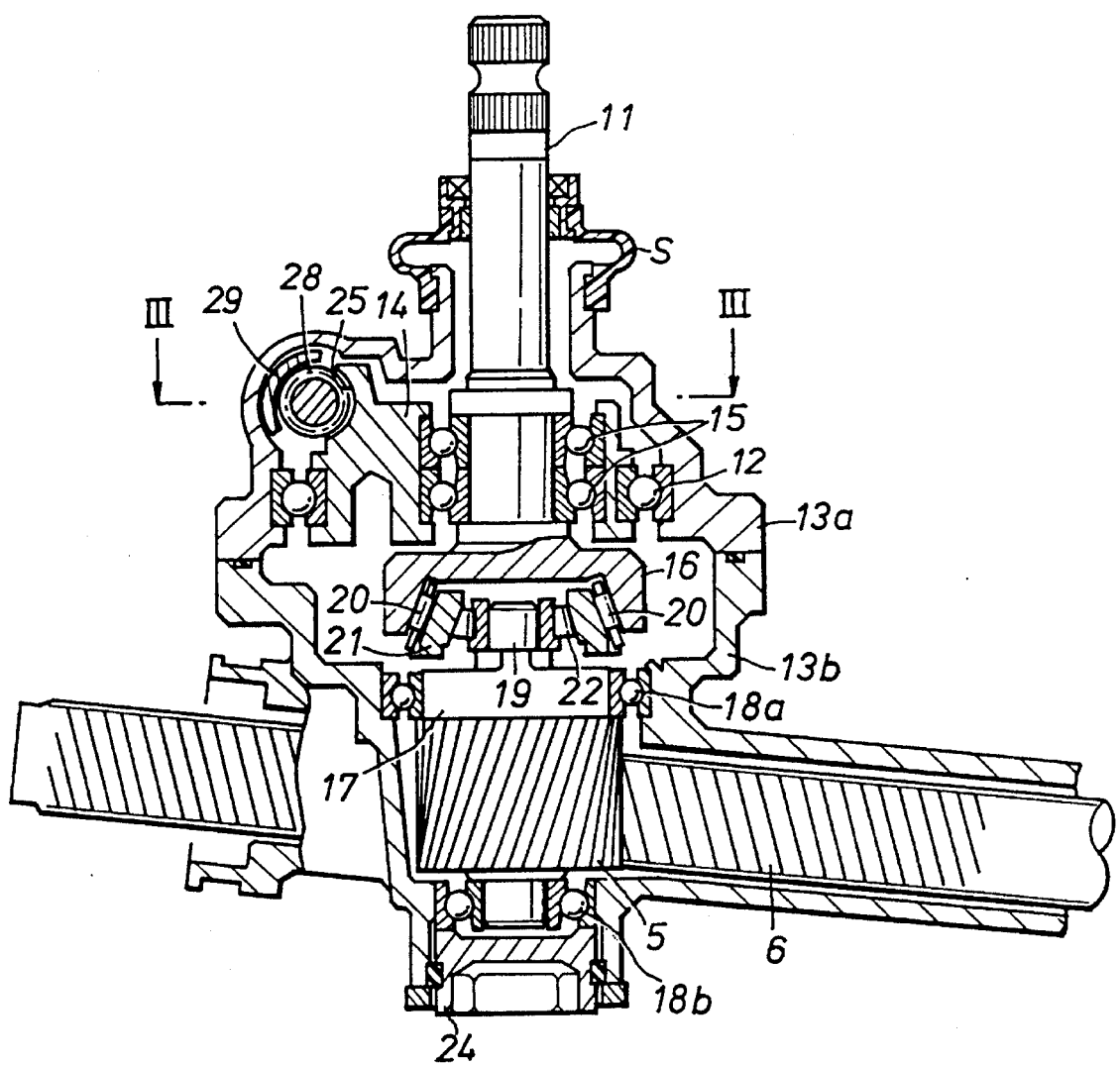
FIG. 1 is a sectional side view showing a first embodiment of the variable ratio steering system according to the present invention.
Figure 2:
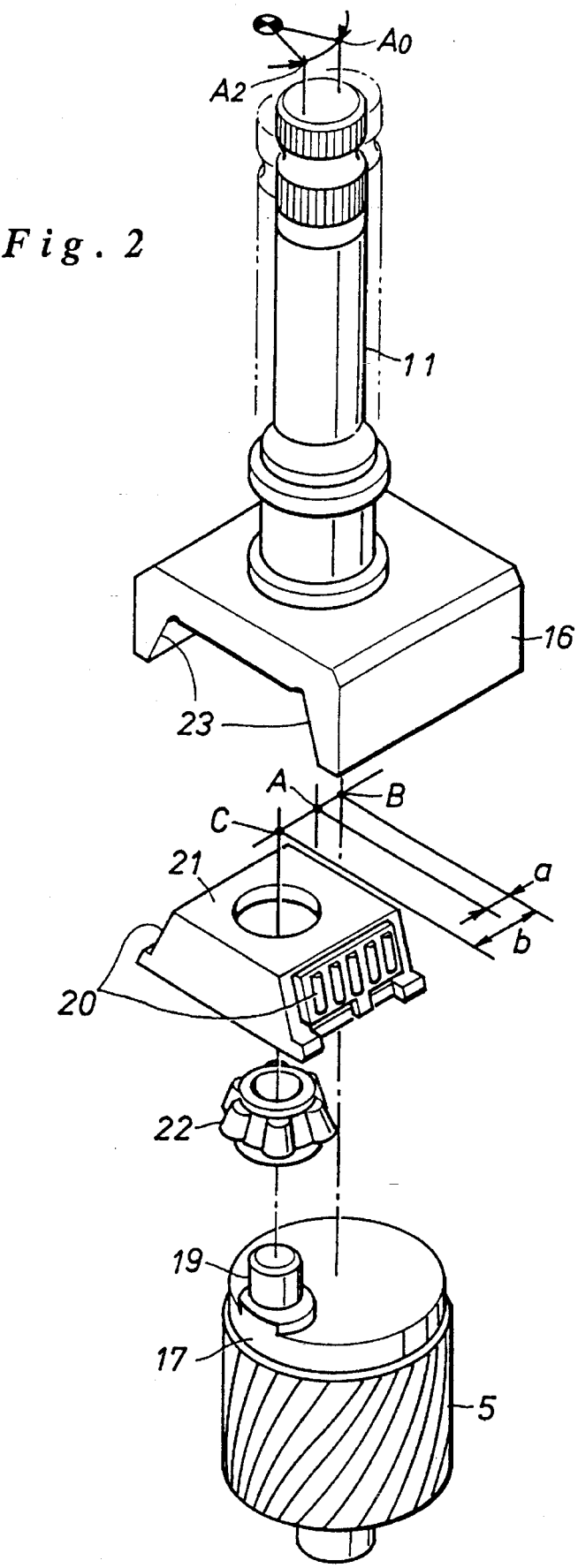
FIG. 2 is an exploded perspective view of major torque transmitting parts of the variable ratio steering system.
Figure 3:
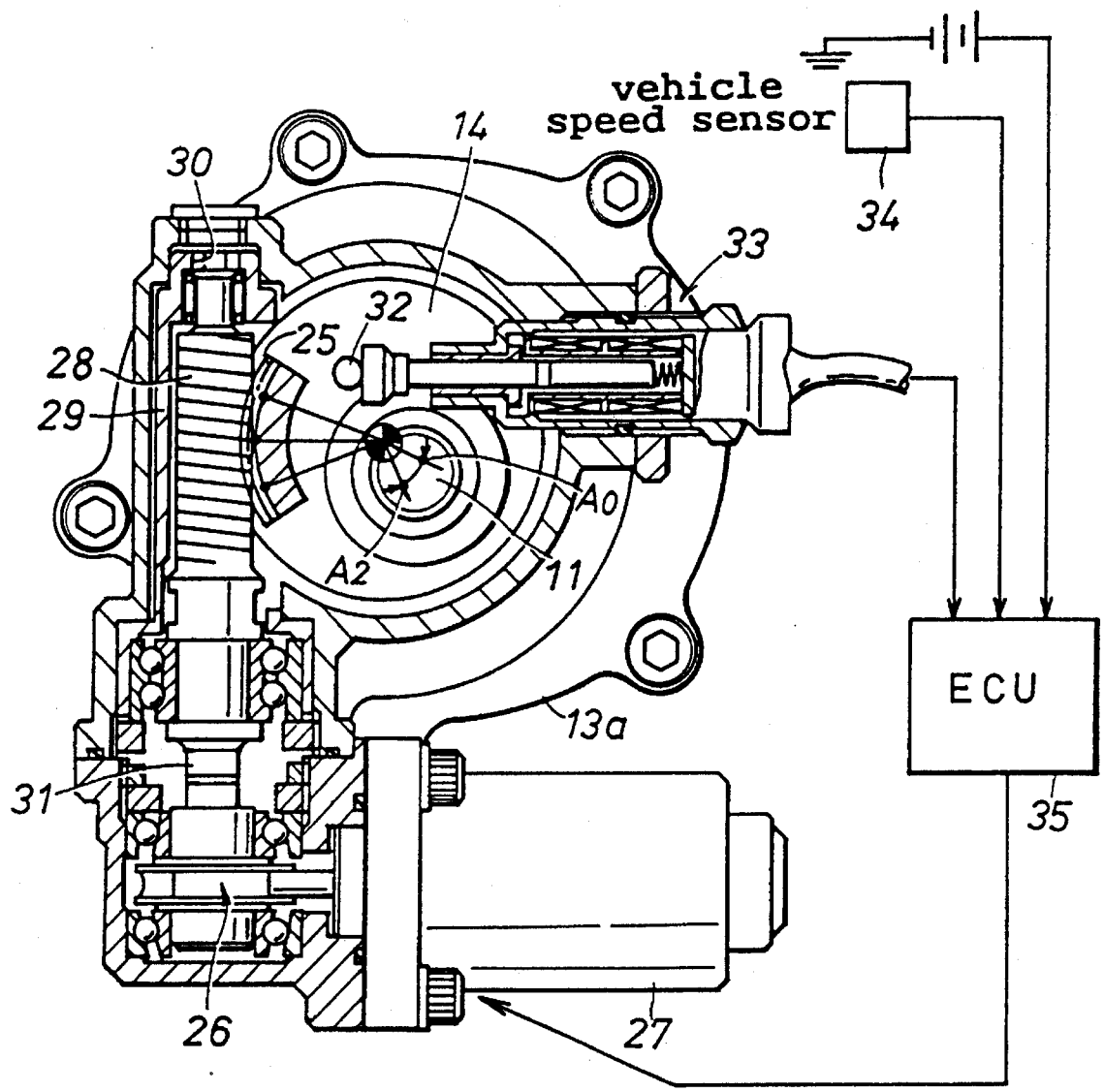
FIG. 3 is a sectional plan view taken along line III—III of FIG. 1.
Figure 8:
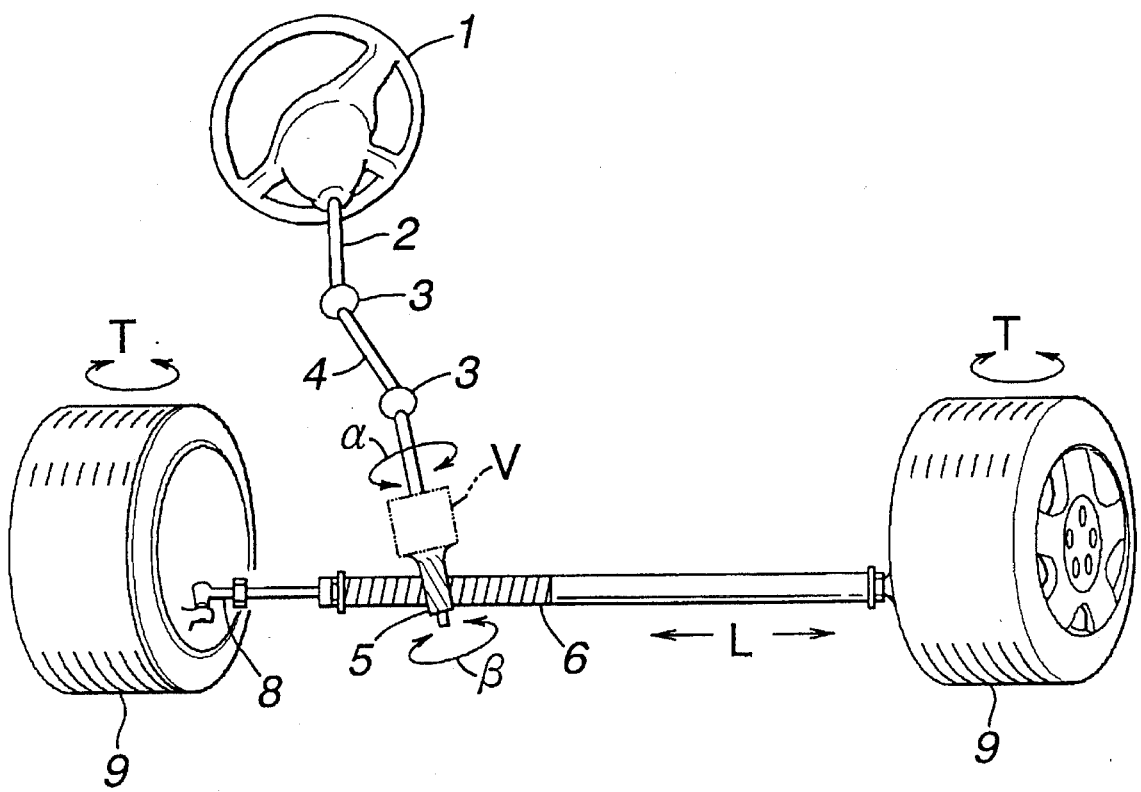
FIG. 8 is a schematic view showing a general structure of a vehicle steering system.

FIGS. 1 through 3 show a first embodiment of the steering system according to the present invention. This steering system is intended to be installed in the part indicated by "V" in FIG. 8, and comprises an input shaft 11 which is connected to the steering wheel 1 (which is not shown in FIG. 1), and a support member 14 which is rotatably supported by an upper casing 13a via a ball bearing 12. The support member 14 supports the input shaft 11 in a freely rotatable manner at an eccentric position thereof via a pair of ball bearings 15. A lower end of the input shaft 11 which is received in a lower casing 13b is integrally provided with a coupling member 16 having a divergent channel-like shape. This coupling member 16 has the shape of letter-C as seen from a side, and defines a pair of inclined planar inner surfaces 23 on either side thereof.

The output shaft 17 is integrally provided with a pinion 5 which meshes with a rack 6 so as to convert the rotational movement of the output shaft 17 into a linear movement of the rack 6, and is rotatably supported by the lower casing 13b via a pair of ball bearings 18a and 18b. The lower end of the output shaft 17 received in the lower casing 13b is also provided with an intermediate shaft 19 which projects eccentrically from the upper end of the output shaft 17, and extends in parallel with the output shaft 17.

The intermediate shaft 19 and the coupling member 16 integrally formed with the input shaft 11 are coupled with each other via a slider 21 incorporated with a pair of planar needle bearings 20 and a conical roller bearing 22. The slider 21 has the shape of a box having an open bottom, and the side walls diverge downward. The needle bearings 20 are placed on the outer surfaces of a pair of opposing inclined side walls of the slider 21, and these side walls are in parallel with the inclined inner side wall surfaces 23 of the coupling member 16.

Thus, the slider 21 incorporated with the pair of planar needle bearings 20 is received in the recess defined between the inclined planar inner surfaces 23 of the coupling member 16 so as to be able to freely slide in a direction perpendicular to the axial line of the input shaft 11. A middle part of the upper wall of the slider 21 is provided with an opening which receives therein the intermediate shaft 19 via the conical roller bearing 22 so as to be freely rotatable relative to each other.

A flexible tubular seal member S is fitted between the input shaft 11 and the upper casing 13a to maintain the interior of the casing in an air tight manner while accommodating lateral movement of the input shaft 11 relative to the casing 13 arising due to the eccentricity of the input shaft 11 relative to the output shaft 17.

An adjust screw 24 is threaded into an axial hole passed through the bottom end of the lower casing 13b and engages the lower end surface of the outer race of the ball bearing 18b supporting the lower end of the output shaft 17. By appropriately threading the adjust screw 24 into and out of the lower casing 13b, the pinion 5 can be appropriately axially urged so as to apply a suitable pre-stress between the input shaft 11 and the output shaft 17 which are coupled with each other via the coupling assembly described above. Thus, by virtue of the adjust screw 24, the play of the coupling assembly consisting of the coupling member 16, the needle bearings 20, and the slider 21 can be removed, and the overall mechanical rigidity of the torque transmitting members of the steering system can be increased.

As best illustrated in FIG. 3, a part of the outer periphery of the support member 14 is integrally provided with a sector gear 25, and a worm 28 rotatively actuated by a motor 27 via a reduction gear unit 26 meshes with this sector gear 25 so that the support member 14 can be rotated within a certain angular range as required. This worm 28 is supported by the upper casing 13a via a backlash removing member 29 consisting of an eccentric cam. By fitting a hexagonal wrench into a hexagonal hole 30 provided in an end portion of the backlash removing member 29, and turning it relative to the upper casing 13a, the axial center of the worm 28 can be laterally moved, and the play in the meshing engagement between the worm 28 and the sector gear 25 can be controlled at will. The backlash removing member 29 can be exposed by removing a rubber or synthetic resin cap fitted into an opening of the upper casing 13a for allowing access to this hexagonal hole 30. To accommodate the thus caused slight movement of the axial center of the worm 28, the worm 28 and the reduction gear unit 26 are connected with each other via an Oldham coupling 31.

The upper casing 13a is provided with a displacement sensor 33 consisting of a differential transformer or the like for detecting the rotational angle of the support member 14 by engaging a pin 32 projecting from an upper surface of the support member 14. A vehicle speed sensor 34 is provided in a suitable location of the vehicle body to detect the travelling speed of the vehicle.

In this steering system, the rotational angle of the support member 14 detected by the displacement sensor 33 or the eccentricity of the input shaft 11 supported by the support member 14 relative to the output shaft 17 which is supported by the fixed casing 13, and the vehicle speed detected by the vehicle speed sensor 34 are supplied to a control unit 35 which controls the operation of the motor 27 by feedback control so as to eliminate the deviation of the actual eccentricity detected by the displacement sensor 33 from a target eccentricity computed for each given vehicle speed.

Now the operation of the steering system according to the present invention is described in the following.

Referring to FIGS. 2 and 3, when the support member 14 is turned, the eccentricity of the support member 14 relative to the input shaft 11 causes the axial center of the input shaft 11 to move over the range indicated by A0–A2. Thus, by appropriately changing the eccentricity "a" between the input shaft 11 and the output shaft 17, a certain difference is created in the relationship between the rotational angles of the input shaft 11 and the output shaft 17 as described hereinafter in more detail.

By varying the eccentricity "a" of the axial center of the input shaft 11 relative to the axial center of the output shaft 17 in a continuous manner over the range of a2–a0 (a2>a1>a0=0), it is possible to change the ratio ($\beta/\alpha$) of the rotational angle of the output shaft (output angle=$\beta$) to the rotational angle of the input shaft 11 (input angle=$\alpha$) or the practical steering gear ratio in a continuous manner.

The relationship between the input angle and the output angle is described in more detail with reference to FIG. 4 in which "A" indicates the rotational center of the input shaft 11, "B" indicates the rotational center of the output shaft 17, "C" indicates the point of action between the input shaft 11 and the intermediate shaft 19, "b" indicates the distance between "B" and "C", "a" indicates the eccentricity between the input shaft 11 and the output shaft 17, "$\alpha$" indicates the rotational angle (steering wheel angle) of the input shaft 11, and "$\beta$" indicates the rotational angle (pinion angle) of the output shaft 17.

Suppose that the point of action between the input shaft 11 and the intermediate shaft 19 is at point P when the input shaft 11 is turned by angle $\alpha$. Because $AP \cdot \sin \alpha = b \cdot \sin \beta$ and $AP \cdot \cos \alpha + a = b \cdot \cos \beta$, $b \cdot \sin \beta / \sin \alpha = (b \cdot \cos \beta - a) \cdot \cos \alpha$.

Hence, $\tan \alpha = b \cdot \sin \beta / (b \cdot \cos \beta - a)$ or, $\alpha = \tan^{-1} \{b \cdot \sin \beta / (b \cdot \cos \beta - a)\}$.

Thus, as the input shaft 11 is turned around point "A" by angle $\alpha$, the intermediate shaft 19 rotates around the output shaft 17 or point "B" by angle β in the manner of a crank shaft via the slider 21 and the coupling member 16. As one can readily see from FIG. 4, as the input angle is increased to α1 and the output angle β is increased to β1 accordingly, the point of action moves to point Q, and the increase in the output angle for a given increment of the input angle increases as described in more detail in the following.

Now, if the axial center of the input shaft 11 is placed at point A0 by turning the supporting member 14 appropriately, and the points A and B are made to coincide with each other, or the input shaft 11 and the output shaft 17 are made to align with each other, they rotate by the same angle or as if they were integrally coupled with each other. This relationship is indicated by the chain dot line a0 in FIG. 5.

Figure 4:
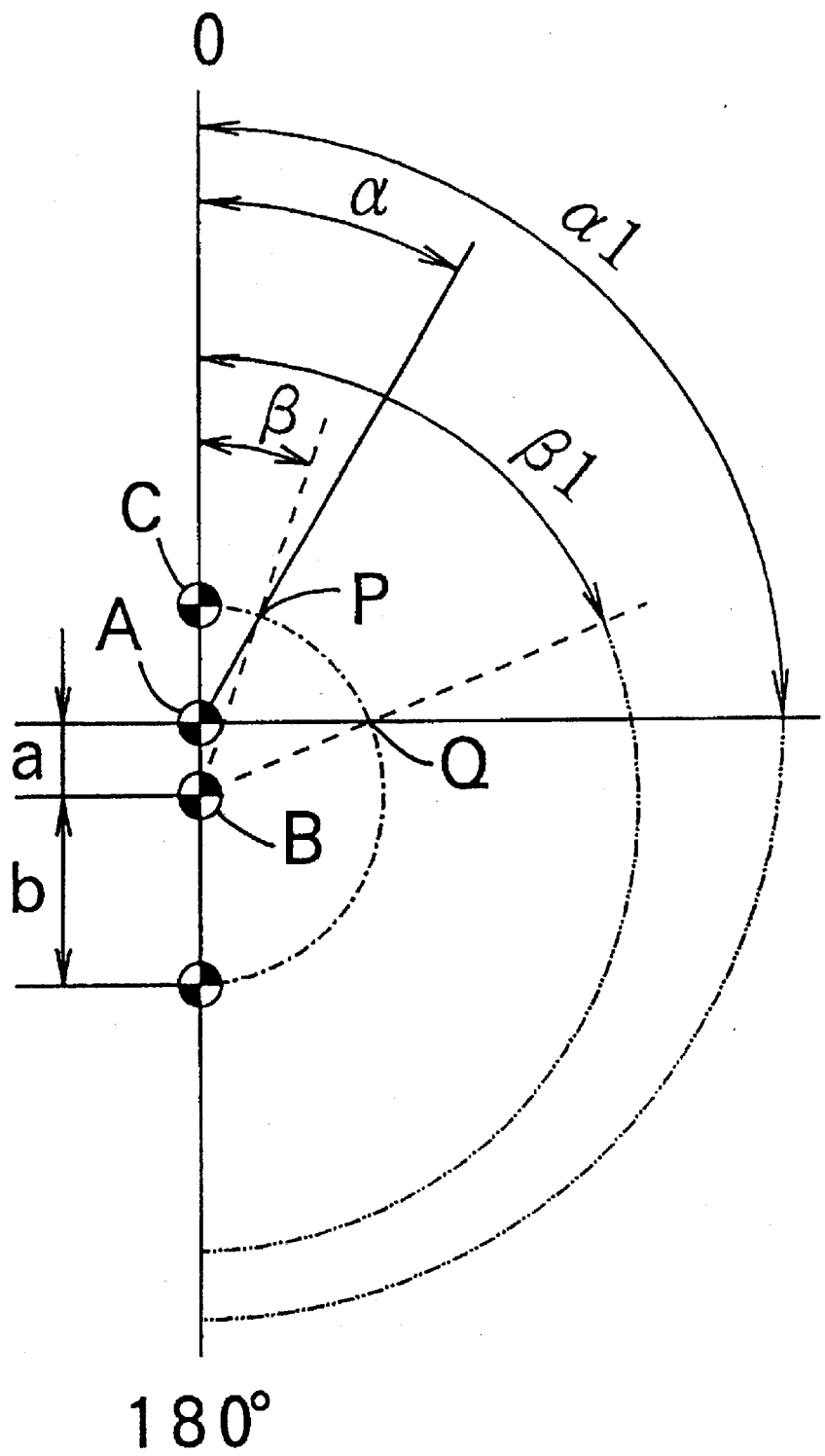
FIG. 4 is a diagram for illustrating the working principle of the present invention.
Figure 5:
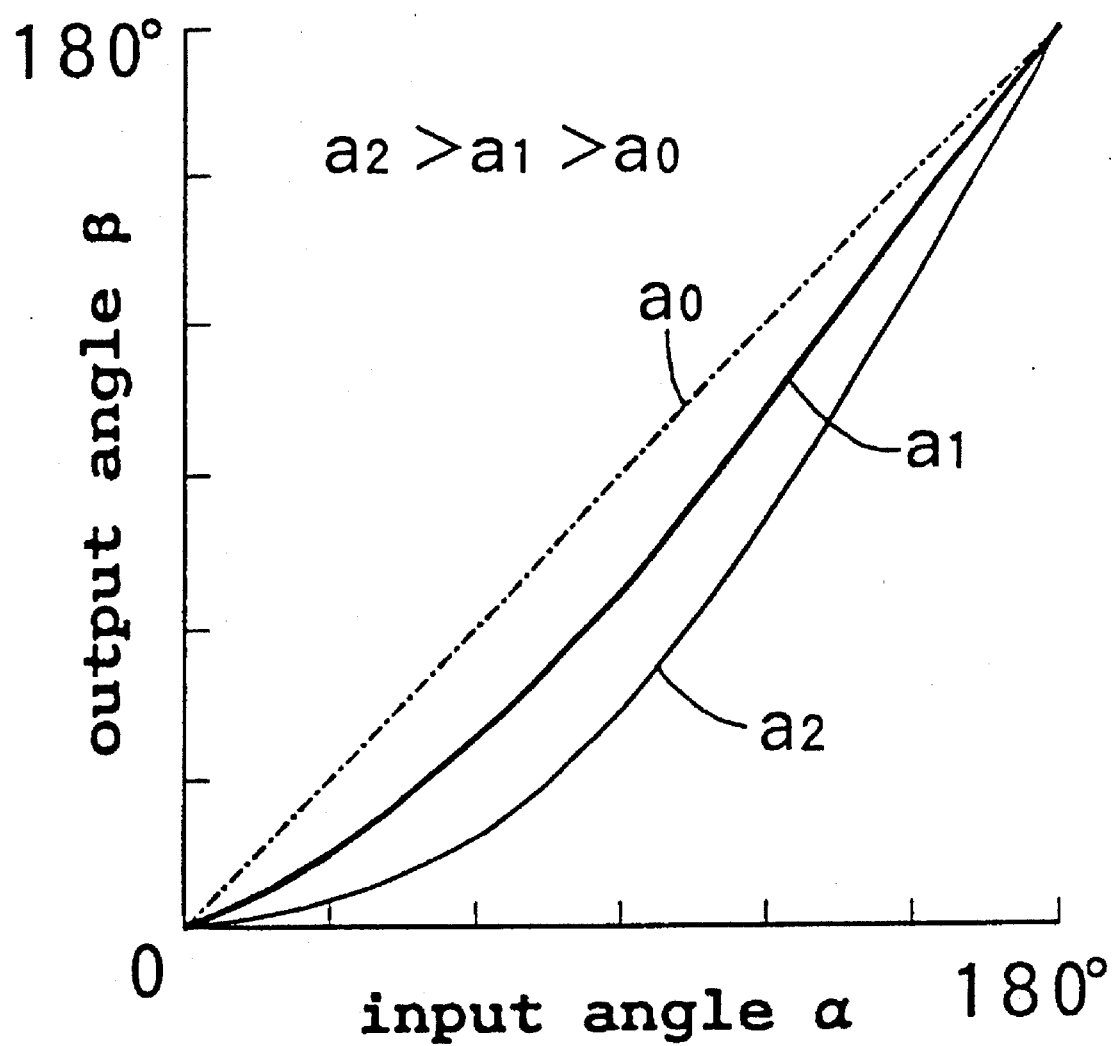
FIG. 5 is a graph showing the relationships between the rotational angle of the input shaft and that of the output shaft for different vehicle speeds.

When the axial center of the input shaft 11 is placed at an intermediate point by turning the supporting member 14 appropriately, and points A and B are arranged as illustrated in FIG. 4 (the general case), the output angle β changes with the input angle α as indicated by the bold curve al in FIG. 5. More specifically, the change in the output angle β for each given increment of the input angle α is relatively small in a low speed range, and progressively increases as the input angle α increases.

When the vehicle speed is increased, and the support member 14 is turned further, and the eccentricity a between the input shaft 11 and the output shaft 17 (or the distance between A and B) is maximized, this tendency is further enhanced as indicated by the fine curve a2 of FIG. 5.

Figure 9:
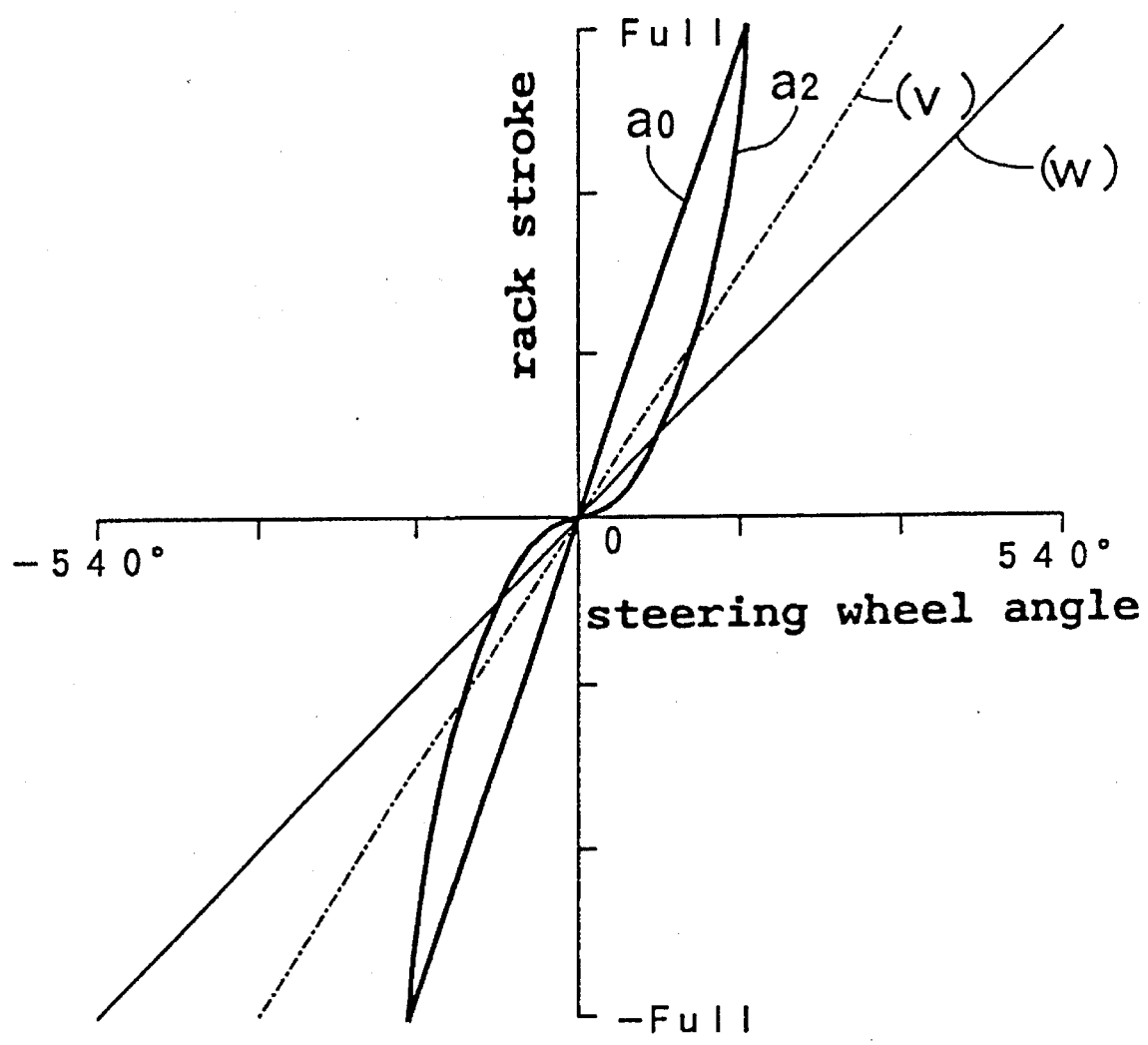
FIG. 9 is a graph showing various possible relationships between the steering input and the rack stroke.
Figure 10:
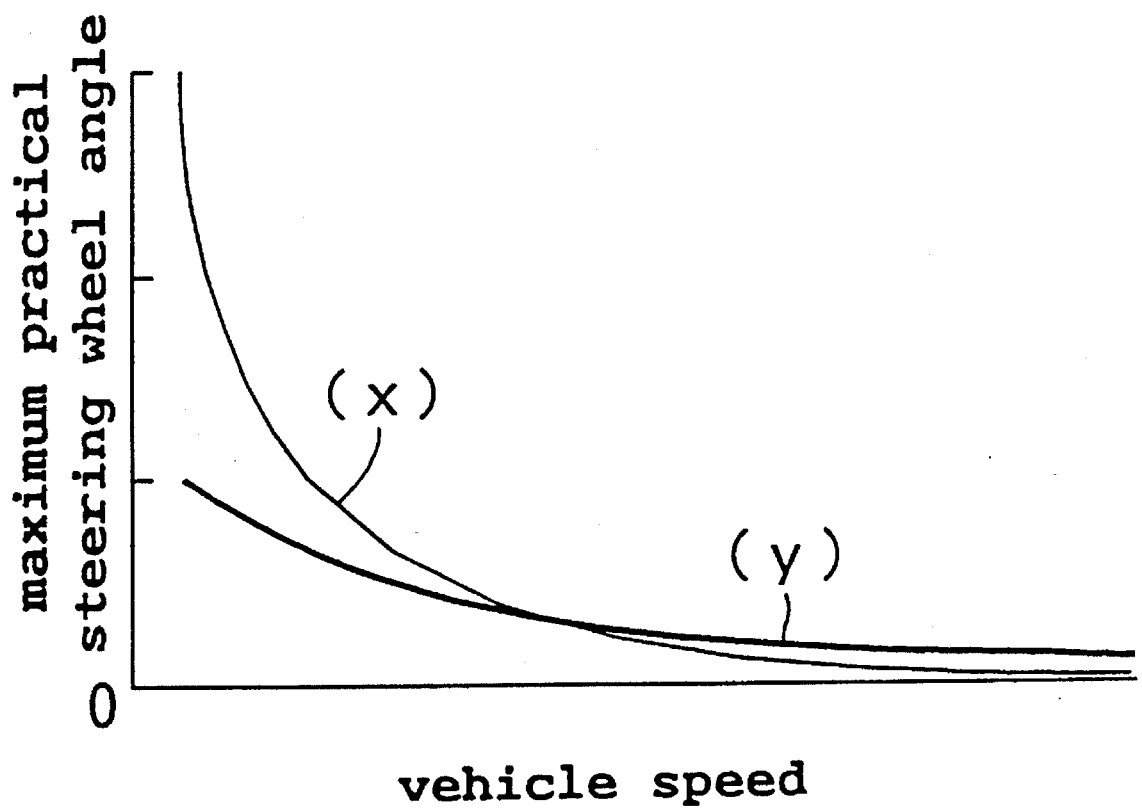
FIG. 10 is a graph showing the relationship between the maximum practical steering input and the vehicle speed.
Figure 11:
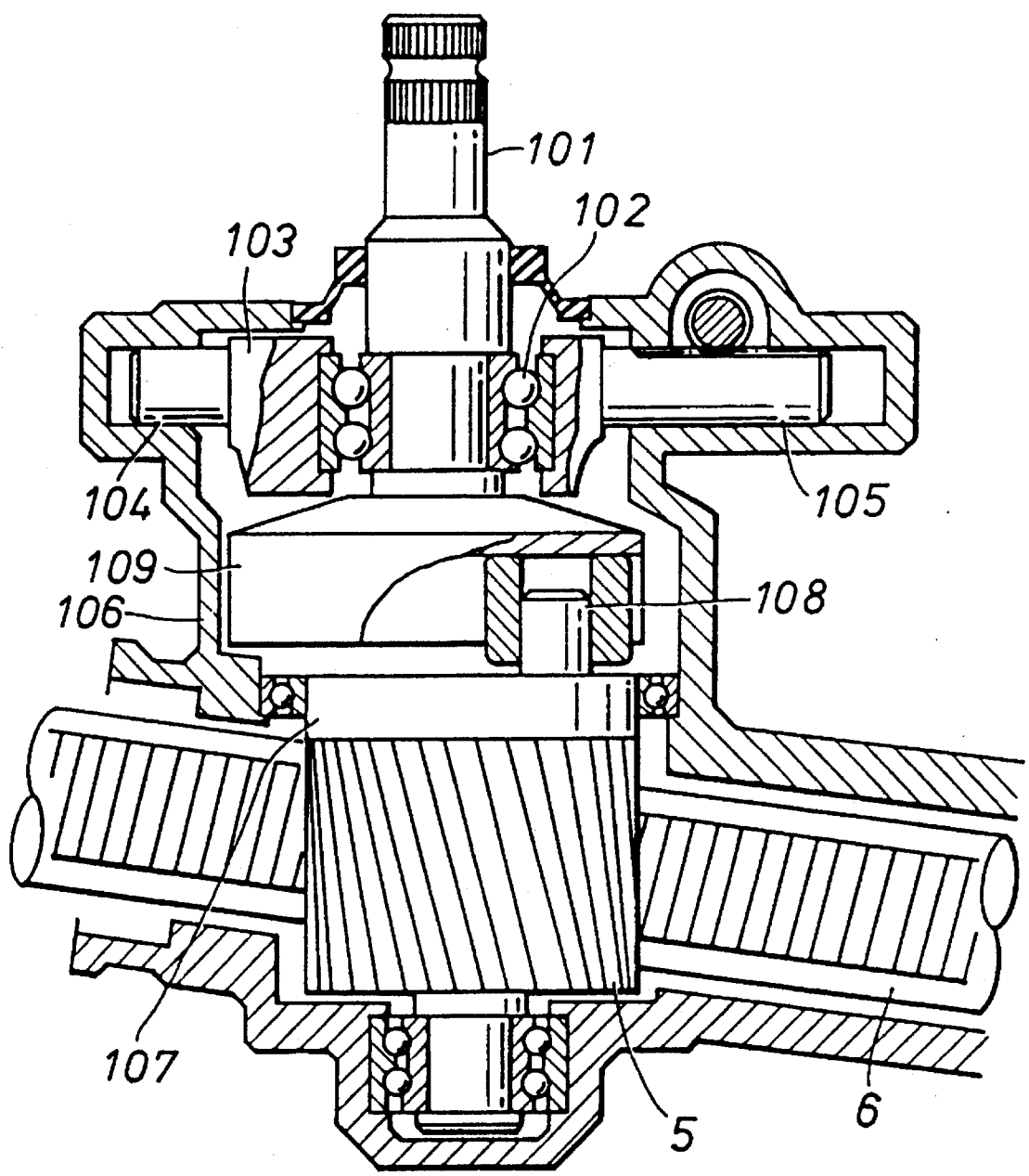
FIG. 11 is a sectional view of a variable ratio steering system which is disclosed in the copending patent application.

Thus, a sharp steering property can be obtained in a low speed range by increasing the stroke L of the rack 6 for a given increment of the steering angle of the steering wheel, and a stable property can be achieved by reducing the rack stroke for a given increment of the steering angle of the steering wheel in a high speed range. Also, at a given vehicle speed (with the exception of an extremely low speed range), the increase in the output angle for a given increment of the input angle is small when the input angle is small, but progressively increases as the input angle is increased. In short, according to the present invention, the relationship between the steering wheel angle and the vehicle speed may be made flat as indicated by the bold curve (y) in FIG. 9.

Figure 6:
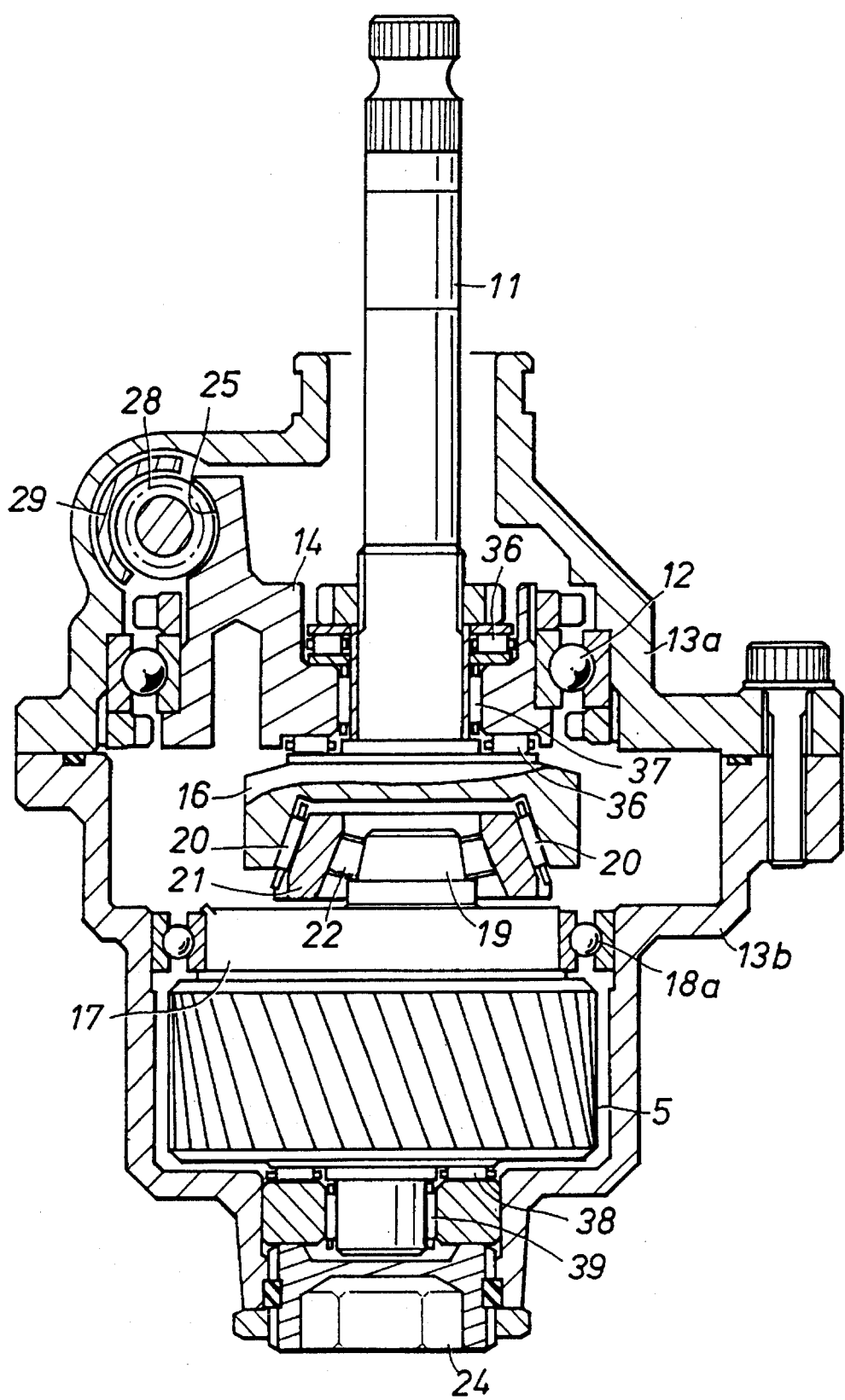
FIG. 6 is a view similar to FIG. 1 showing a second embodiment of the present invention.
Figure 7:
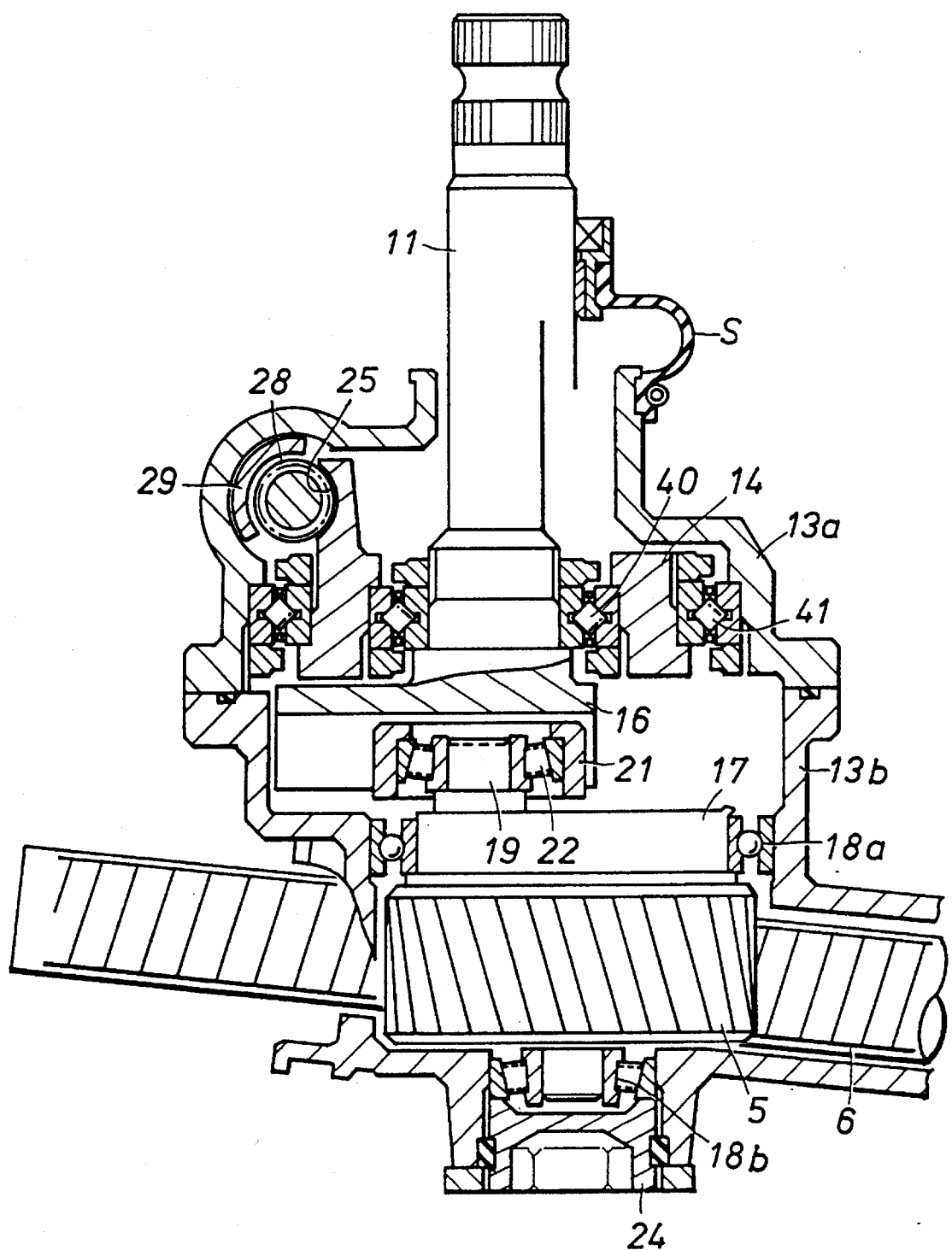
FIG. 7 is a view similar to FIG. 1 showing a third embodiment of the present invention.

Now a second embodiment of the steering system according to the present invention is described with reference to FIG. 6 in which the parts corresponding to those of the previous embodiment are denoted with like numerals. In this embodiment, the input shaft 11 is pivotably attached to the support member 14 via a pair of thrust needle bearings 36 and a radial needle bearing 37, and the lower end of the output shaft 17 is pivotably attached to the lower casing 13b via a thrust needle bearing 38 and a radial needle bearing 39 while the upper end of the output shaft 17 is rotatably supported by the lower casing 13b via a radial ball bearing 18a.

In this embodiment, owing to the use of needle bearings for both the radial bearings and the thrust bearings, the outer diameter of the bearing assembly can be reduced. It is known that needle bearings can improve mechanical strength, durability and rigidity because the needles serving as the rolling elements are designed to make line contact with adjacent members as opposed to ball elements which make point contact with adjacent members.

Now a third embodiment of the steering system according to the present invention is described with reference to FIG. 6 in which the parts corresponding to those of the previous embodiments are denoted with like numerals. In this embodiment, the input shaft 11 and the support member 14 are supported by cross roller bearings 40 and 41 which are capable of supporting both radial and thrust loads. In these bearings, the rollers are arranged so as to be mutually perpendicularly oriented in an alternating fashion, and it is therefore possible to reduce both the radial and longitudinal dimensions. Generally, rack and pinion steering gear devices are particularly preferred for vehicles having a limited space above the pinion, and this embodiment is highly advantageous for application to such rack and pinion steering gear devices.

Thus, according to the present invention, a desirable nonlinear relationship can be achieved between the input shaft and the output shaft, and an optimum steering gear ratio can be achieved in all speed ranges. It is therefore possible to improve the handling of the vehicle, for instance in parking the vehicle in a small space, and steer the vehicle with a least amount of effort in a low speed range, and to increase the stability of the vehicle in a high speed range.

Furthermore, this can be achieved with a highly simple structure. In particular, because the support member is rotatably supported by the casing, and other members for transmitting steering torque are all rotatably supported, it is possible to increase the precision and remove undesirable plays. Also, the overall mechanical rigidity, mechanical strength and durability of the torque transmitting members can be improved.

Although the present invention has been described in terms of specific embodiments, it is possible to modify and alter details thereof without departing from the spirit of the present invention.

What we claim is:

1. A variable ratio steering system for a vehicle which can vary a ratio of a steering angle of steerable wheels to a steering angle of a steering wheel, comprising:

a casing;

a support member supported in said casing so as to be rotatable around a first axial line;

an first shaft supported by said support member so as to be rotatable around a second axial line which is parallel with and offset from said first axial line;

a second shaft supported by said casing so as to be rotatable around a third axial line which is parallel with said first and second axial lines;

a pinion connected to one of said first and second shafts in power transmitting relationship and adapted to mesh with a rack functionally connected to said steerable wheels;

actuating means for turning said support member around said first axial line for changing a relative eccentricity between said first shaft and said second shaft; and coupling means for transmitting an angular movement of said first shaft to said second shaft via a point of action of said second shaft offset from said third axial line; and input means for applying a steering input to the other one of said first and second shafts.

2. A variable ratio steering system for a vehicle according to claim 1, wherein said coupling means comprises a slider provided on an end of said first shaft opposing said second shaft and adapted to move in a direction perpendicular to said second axial line, and pivot means for pivotably coupling said slider to said point of action of said second shaft.

3. A variable ratio steering system for a vehicle according to claim 2, wherein said second shaft is provided with an intermediate shaft projecting integrally from an end of said second shaft opposing said first shaft in parallel with and offset from said third axial line, and said slider is provided with a hole for pivotably receiving said intermediate shaft.

4. A variable ratio steering system for a vehicle according to claim 1, wherein said casing comprises at least a first casing half which rotatably supports said first shaft, and a second casing half which rotatably supports said second shaft, said two casing halves being joined together at a plane substantially perpendicular to said axial lines and passing through said coupling means.

5. A variable ratio steering system for a vehicle according to claim 1, wherein relative relationships between said axial lines and a rotatable range of said support member are determined so that a ratio of a rotational angle of said second shaft to that of said first shaft may be small when the rotational angle of said first shaft is small, and may progressively increase as the rotational angle of said first shaft increases.

6. A variable ratio steering system for a vehicle according to claim 1, wherein relative relationships between said axial lines and a rotatable range of said support member are determined so that said second axial line and said third axial line may be aligned with each other when so desired, and a one-to-one angle ratio and a linear relationship may be achieved between said first shaft and said second shaft.

7. A variable ratio steering system for a vehicle according to claim 1, further comprising a vehicle speed sensor, and a control unit which controls said actuating means so as to increase a difference in said ratio between a small rotational angle range and a large rotational angle range of said first shaft as a vehicle speed detected by said speed sensor increases.

8. A variable ratio steering system for a vehicle according to claim 1, wherein said actuating means comprises an electric motor mounted in said casing, a worm secured to an second shaft of said motor, and a sector gear integrally formed with said support member and meshing with said worm.

9. A variable ratio steering system for a vehicle which can vary a ratio of a steering angle of steerable wheels to a steering angle of a steering wheel, comprising:

a casing;

a support member supported in said casing so as to be rotatable around a first axial line;

an input shaft supported by said support member so as to be rotatable around a second axial line which is parallel with and offset from said first axial line;

an output shaft supported by said casing so as to be rotatable around a third axial line which is parallel with said first and second axial lines;

a pinion coaxially formed on said output shaft and adapted to mesh with a rack functionally connected to said steerable wheels;

actuating means for turning said support member around said first axial line for changing a relative eccentricity between said input shaft and said output shaft; and coupling means for transmitting an angular movement of said input shaft to said output shaft via a point of action of said output shaft offset from said third axial line.

* * * * *